United States Patent
Kryj-Kos et al.

(10) Patent No.: US 11,725,524 B2
(45) Date of Patent: Aug. 15, 2023

(54) ENGINE AIRFOIL METAL EDGE

(71) Applicants: General Electric Company, Schenectady, NY (US); General Electric Company Polska Sp. z o.o., Warsaw (PL)

(72) Inventors: Elzbieta Kryj-Kos, Liberty Township, OH (US); Piotr Jerzy Kulinski, Warsaw (PL); Pawel Adam Lewicki, Warsaw (PL); Ruolong Ma, Mason, OH (US); Wendy Wenling Lin, Montgomery, OH (US); Patrick Keene Clements, Cincinnati, OH (US)

(73) Assignees: General Electric Company, Schenectady, NY (US); General Electric Company Polska Sp. Z o.o., Warsaw (PL)

( * ) Notice: Subject to any disclaimer, the term of this patent is extended or adjusted under 35 U.S.C. 154(b) by 0 days.

(21) Appl. No.: 17/389,945

(22) Filed: Jul. 30, 2021

(65) Prior Publication Data
US 2022/0307380 A1 Sep. 29, 2022

(30) Foreign Application Priority Data
Mar. 26, 2021 (PL) .......................... 437428

(51) Int. Cl.
*F01D 9/02* (2006.01)
(52) U.S. Cl.
CPC ............ *F01D 9/02* (2013.01); *F05D 2230/31* (2013.01); *F05D 2240/121* (2013.01); *F05D 2250/185* (2013.01)

(58) Field of Classification Search
CPC .. F01D 9/02; F05D 2230/31; F05D 2240/121; F05D 2250/185
See application file for complete search history.

(56) References Cited

U.S. PATENT DOCUMENTS

| | | |
|---|---|---|
| 2,637,405 A | 5/1953 | Stanley |
| 2,990,309 A | 6/1961 | Wahl et al. |
| 3,028,292 A | 4/1962 | Hinds |

(Continued)

FOREIGN PATENT DOCUMENTS

| | | |
|---|---|---|
| DE | 2947247 A1 | 5/1981 |
| EP | 2182096 A1 | 5/2010 |

(Continued)

OTHER PUBLICATIONS

Translation of FR-3073018-A1 (Year: 2019).*
(Continued)

*Primary Examiner* — Courtney D Heinle
*Assistant Examiner* — Danielle M. Christensen
(74) *Attorney, Agent, or Firm* — McGarry Bair PC

(57) ABSTRACT

An airfoil for a gas turbine engine defining a spanwise direction, a root end, a tip end, a leading edge end, and trailing edge end is provided. The airfoil includes: a body extending along the spanwise direction between the root end and the tip end, the body formed of a composite material; and a sculpted leading edge member attached to the body positioned at the leading edge end of the airfoil, the sculped leading edge member formed at least in part of a metal material and defining a non-linear patterned leading edge of the airfoil.

17 Claims, 8 Drawing Sheets

(56) References Cited

U.S. PATENT DOCUMENTS

| | | | |
|---|---|---|---|
| 3,369,782 A | 2/1968 | Billig et al. | |
| 3,464,898 A | 9/1969 | Norris | |
| 3,476,625 A | 11/1969 | Slivinsky et al. | |
| 3,554,875 A | 1/1971 | MacKinney et al. | |
| 3,616,433 A | 10/1971 | Williams | |
| 3,762,835 A | 10/1973 | Carlson et al. | |
| 3,892,612 A | 7/1975 | Carlson et al. | |
| 3,923,421 A | 12/1975 | Carter et al. | |
| 4,275,994 A | 6/1981 | Underhill, Jr. | |
| 4,329,119 A | 5/1982 | Baskin | |
| 4,648,921 A | 3/1987 | Nutter | |
| 4,706,910 A | 11/1987 | Walsh et al. | |
| 4,786,015 A | 11/1988 | Niggemann | |
| 4,986,496 A | 1/1991 | Marentic et al. | |
| 5,133,519 A | 7/1992 | Falco | |
| 5,306,120 A | 4/1994 | Hammer et al. | |
| 5,368,711 A | 11/1994 | Poris | |
| 5,386,955 A | 2/1995 | Savill | |
| 5,449,273 A | 9/1995 | Hertel et al. | |
| 5,486,096 A | 1/1996 | Hertel et al. | |
| 5,674,370 A | 10/1997 | DuPree | |
| 5,803,409 A | 9/1998 | Keefe | |
| 5,881,972 A | 3/1999 | Smith et al. | |
| 5,908,285 A | 6/1999 | Graff | |
| 6,050,523 A | 4/2000 | Kraenzien | |
| 6,207,034 B1 | 3/2001 | Madden et al. | |
| 6,221,230 B1 | 4/2001 | Takeuchi et al. | |
| 6,290,895 B1 | 9/2001 | Wang et al. | |
| 6,447,254 B1 | 9/2002 | Holowczak et al. | |
| 6,620,519 B2 | 9/2003 | Modi | |
| 6,655,633 B1 | 12/2003 | Chapman, Jr. | |
| 6,689,269 B1 | 2/2004 | Schuster et al. | |
| 6,905,307 B2 | 6/2005 | Kawarada et al. | |
| 7,013,551 B2 | 3/2006 | Green et al. | |
| 7,063,763 B2 | 6/2006 | Chapman, Jr. | |
| 7,070,850 B2 | 7/2006 | Dietz et al. | |
| 7,435,324 B2 | 10/2008 | Ramarajan et al. | |
| 7,510,778 B2 | 3/2009 | Bernard et al. | |
| 7,615,141 B2 | 11/2009 | Schwartz et al. | |
| 7,805,839 B2 | 10/2010 | Cammer | |
| 7,955,486 B2 | 6/2011 | Yu et al. | |
| 8,168,291 B2 * | 5/2012 | Shah | C04B 35/185 |
| | | | 428/293.1 |
| 8,684,310 B2 | 4/2014 | Rawlings et al. | |
| 9,234,351 B1 | 1/2016 | Echelman | |
| 9,249,666 B2 | 2/2016 | Wood et al. | |
| 9,481,451 B2 | 11/2016 | Rawlings et al. | |
| 9,482,095 B2 | 11/2016 | Drane | |
| 9,551,294 B2 | 1/2017 | Czapski, Jr. et al. | |
| 9,650,897 B2 * | 5/2017 | Deal | F02K 3/06 |
| 9,657,576 B2 | 5/2017 | Ramm et al. | |
| 9,677,186 B2 | 6/2017 | Braun et al. | |
| 9,745,851 B2 | 8/2017 | Li et al. | |
| 10,294,573 B2 * | 5/2019 | Parkos, Jr. | C25D 1/02 |
| 10,450,867 B2 | 10/2019 | Bunker | |
| 10,539,025 B2 * | 1/2020 | Kray | F01D 9/041 |
| 10,760,600 B2 | 9/2020 | Watson et al. | |
| 2001/0015043 A1 | 8/2001 | Brenneis et al. | |
| 2003/0031564 A1 | 2/2003 | Kawarada et al. | |
| 2006/0018760 A1 | 1/2006 | Bruce et al. | |
| 2006/0049038 A1 | 3/2006 | Griego et al. | |
| 2007/0251825 A1 | 11/2007 | Kenney | |
| 2008/0124512 A1 | 5/2008 | Steibel et al. | |
| 2008/0268258 A1 | 10/2008 | Verma et al. | |
| 2010/0014964 A1 | 1/2010 | Smith et al. | |
| 2010/0054945 A1 | 3/2010 | McMillan et al. | |
| 2010/0148006 A1 | 6/2010 | Olmi et al. | |
| 2010/0232974 A1 | 9/2010 | De Moura et al. | |
| 2011/0097213 A1 | 4/2011 | Peretti et al. | |
| 2011/0211967 A1 | 9/2011 | Deal et al. | |
| 2011/0262705 A1 | 10/2011 | Gupta et al. | |
| 2012/0082541 A1 | 4/2012 | Macchia et al. | |
| 2012/0163981 A1 | 6/2012 | Hong | |
| 2013/0082142 A1 | 4/2013 | Li et al. | |
| 2013/0146217 A1 | 6/2013 | Kray et al. | |
| 2013/0156592 A1 | 6/2013 | Kray et al. | |
| 2013/0199934 A1 | 8/2013 | Parkos, Jr. et al. | |
| 2014/0133987 A1 | 5/2014 | Guinaldo Fernandez et al. | |
| 2014/0202170 A1 | 7/2014 | Cook, III | |
| 2015/0048209 A1 | 2/2015 | Hoyt et al. | |
| 2015/0063903 A1 | 3/2015 | Matthews et al. | |
| 2015/0086378 A1 | 3/2015 | Klein et al. | |
| 2015/0104323 A1 | 4/2015 | Franchet et al. | |
| 2015/0184306 A1 | 7/2015 | Parkos, Jr. et al. | |
| 2015/0298787 A1 | 10/2015 | Nordin et al. | |
| 2015/0361802 A1 | 12/2015 | Yoshida et al. | |
| 2016/0017509 A1 | 1/2016 | Agustoni | |
| 2016/0108747 A1 * | 4/2016 | Obuchi | F04D 29/644 |
| | | | 415/200 |
| 2016/0243586 A1 | 8/2016 | Travis | |
| 2016/0271930 A1 | 9/2016 | Roper et al. | |
| 2016/0312035 A1 | 10/2016 | Song | |
| 2016/0318603 A1 | 11/2016 | Rawlings et al. | |
| 2016/0345430 A1 | 11/2016 | Khan et al. | |
| 2017/0044680 A1 | 2/2017 | Sundaram | |
| 2017/0100877 A1 | 4/2017 | Song | |
| 2017/0101878 A1 | 4/2017 | Wang et al. | |
| 2017/0137116 A1 | 5/2017 | Ireland et al. | |
| 2017/0145578 A1 | 5/2017 | Wirth et al. | |
| 2017/0167510 A1 | 6/2017 | Berschback et al. | |
| 2018/0015996 A1 | 1/2018 | Shemkunas et al. | |
| 2018/0022438 A1 | 1/2018 | Cresp Pena et al. | |
| 2018/0045216 A1 * | 2/2018 | Karlen | F04D 29/023 |
| 2018/0178461 A1 | 6/2018 | Kim et al. | |
| 2018/0312987 A1 | 11/2018 | Jonnalagadda et al. | |
| 2019/0017185 A1 | 1/2019 | Takshi et al. | |
| 2019/0055661 A1 | 2/2019 | Huang | |
| 2019/0136697 A1 * | 5/2019 | Foster | F01D 25/005 |
| 2020/0102835 A1 | 4/2020 | Bryant, Jr. | |
| 2020/0109480 A1 | 4/2020 | Sridharan et al. | |
| 2020/0190681 A1 | 6/2020 | Tajiri et al. | |
| 2020/0200017 A1 * | 6/2020 | Taylor | F01D 5/147 |
| 2021/0010377 A1 * | 1/2021 | Blanquart | B29C 66/721 |

FOREIGN PATENT DOCUMENTS

| | | | | |
|---|---|---|---|---|
| FR | 3073018 A1 * | 5/2019 | | F01D 5/141 |
| GB | 1213821 A | 11/1970 | | |
| JP | S5257038 A | 5/1977 | | |
| JP | H2135795 U | 11/1990 | | |
| JP | 2008/510889 A | 4/2008 | | |
| WO | WO2014/128898 A1 | 8/2014 | | |
| WO | WO2015/042089 A1 | 3/2015 | | |

OTHER PUBLICATIONS

Volgin et al. Effect of Anode Shape on Uniformity of Electrodeposition onto Resistive Substrates, ScienceDirect, Electrochimica Acts, vol. 230, Mar. 10, 2017, pp. 382-390. (Abstract Only).

\* cited by examiner

ENGINE AIRFOIL METAL EDGE

FEDERALLY SPONSORED RESEARCH

This invention was made with government support under contract reference number DTFAWA-15-A-80013 awarded by the Federal Aviation Administration. The U.S. government may have certain rights in the invention.

CROSS-REFERENCE TO RELATED APPLICATIONS

This application claims priority to Polish Patent Application No. P.437428, filed Mar. 26, 2021.

FIELD

The present subject matter relates generally to components of a gas turbine engine, or more particularly to an airfoil having a metal edge.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan includes a plurality of circumferentially spaced fan blades extending radially outward from a rotor disk. Rotation of the fan blades creates an airflow through the inlet to the turbomachine, as well as an airflow over the turbomachine. For certain gas turbine engines, a plurality of outlet guide vanes are provided downstream of the fan for straightening the airflow from the fan to increase, e.g., an amount of thrust generated by the fan.

Improvements to the outlet guide vanes, and other airfoils within the gas turbine engine, would be welcomed in the art.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an airfoil for a gas turbine engine defining a spanwise direction, a root end, a tip end, a leading edge end, and trailing edge end is provided. The airfoil includes: a body extending along the spanwise direction between the root end and the tip end, the body formed of a composite material; and a sculpted leading edge member attached to the body positioned at the leading edge end of the airfoil, the sculped leading edge member formed at least in part of a metal material and defining a non-linear patterned leading edge of the airfoil.

In one exemplary aspect of the present disclosure, a method is provided for forming an airfoil. The method includes adding a conductive layer to a filler for an edge member of the airfoil; and electroforming an edge shell over the filler, the edge shell formed of a metal material.

In another exemplary aspect of the present disclosure, an airfoil for a gas turbine engine is provided defining a spanwise direction, a root end, and a tip end. The airfoil includes a body extending along the spanwise direction between the root end and the tip end, the body formed of a composite material; and an edge member including an edge shell formed of the metal material and defining at least in part an internal cavity; filler positioned in the internal cavity; and an intermediate layer between the filler and the edge shell and extending at least partially over the body, wherein the intermediate layer is bonded to the body and the edge shell is bonded to the intermediate layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
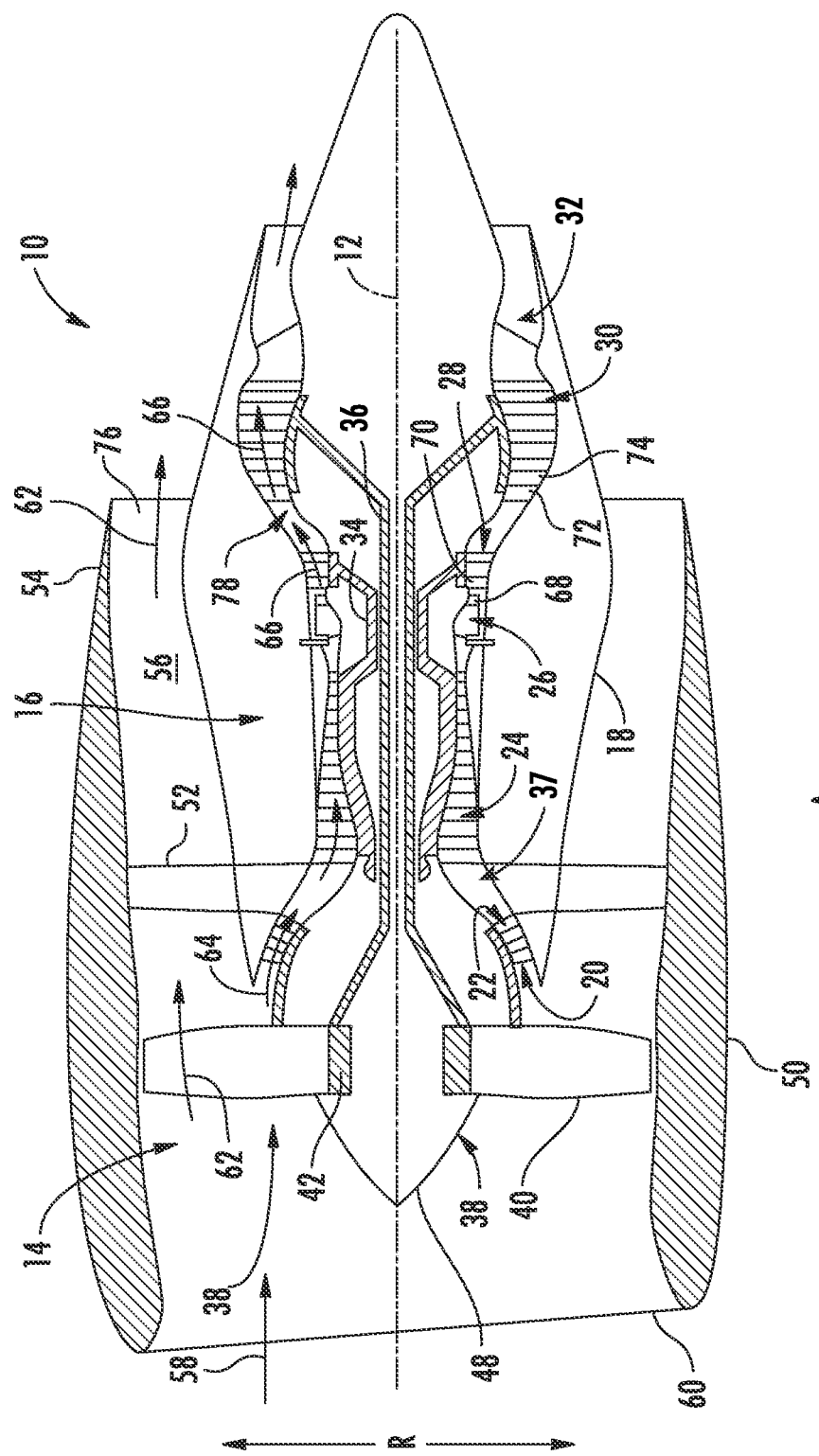
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, an airfoil for a gas turbine engine is provided. The airfoil generally includes a sculpted leading edge member attached to the body and positioned at a leading edge end of the airfoil. The sculpted leading edge member formed at least in part of a metal material and defining a non-linear patterned leading edge of the airfoil.

In certain exemplary aspects, the one or more aspects of the sculped leading edge member may be formed using an electroforming process. In such a manner, the sculped leading edge member may include a filler material, an intermediate layer positioned at least partially over the filler material, and a shell. The filler material may be a non-electrically conductive material and the intermediate layer may be an electrically conductive layer. The shell may be electroformed over the intermediate layer.

In certain configurations, the intermediate layer may be bonded to the body of the airfoil to attach the sculped leading edge member to the body of the airfoil.

An airfoil having a sculped leading edge member in accordance with such a configuration may provide a reduction in fan noise attenuation. Further, inclusion of a sculped leading edge member in accordance with the present disclosure may also facilitate the airfoil meeting structural requirements for, e.g., bird strikes, while maintaining a relatively low overall weight. Further still, inclusion of a sculped leading edge member in accordance with the present disclosure may also provide for a strong bond between the metal portion of the sculped leading edge member and the body, which may be formed of a composite material, while also completely enclosing a light-weight, foam filler material.

Referring now to the drawings, wherein identical numerals indicate the same elements throughout the Figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 2). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the core 16 by a plurality of circumferentially-spaced outlet guide vanes 52. According to one exemplary embodiment, outlet guide vanes 52 may be installed in turbofan engine 10 as part of a fan frame assembly 100, as will be described in detail below. Moreover, a downstream section 54 of the nacelle 50 may extend over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
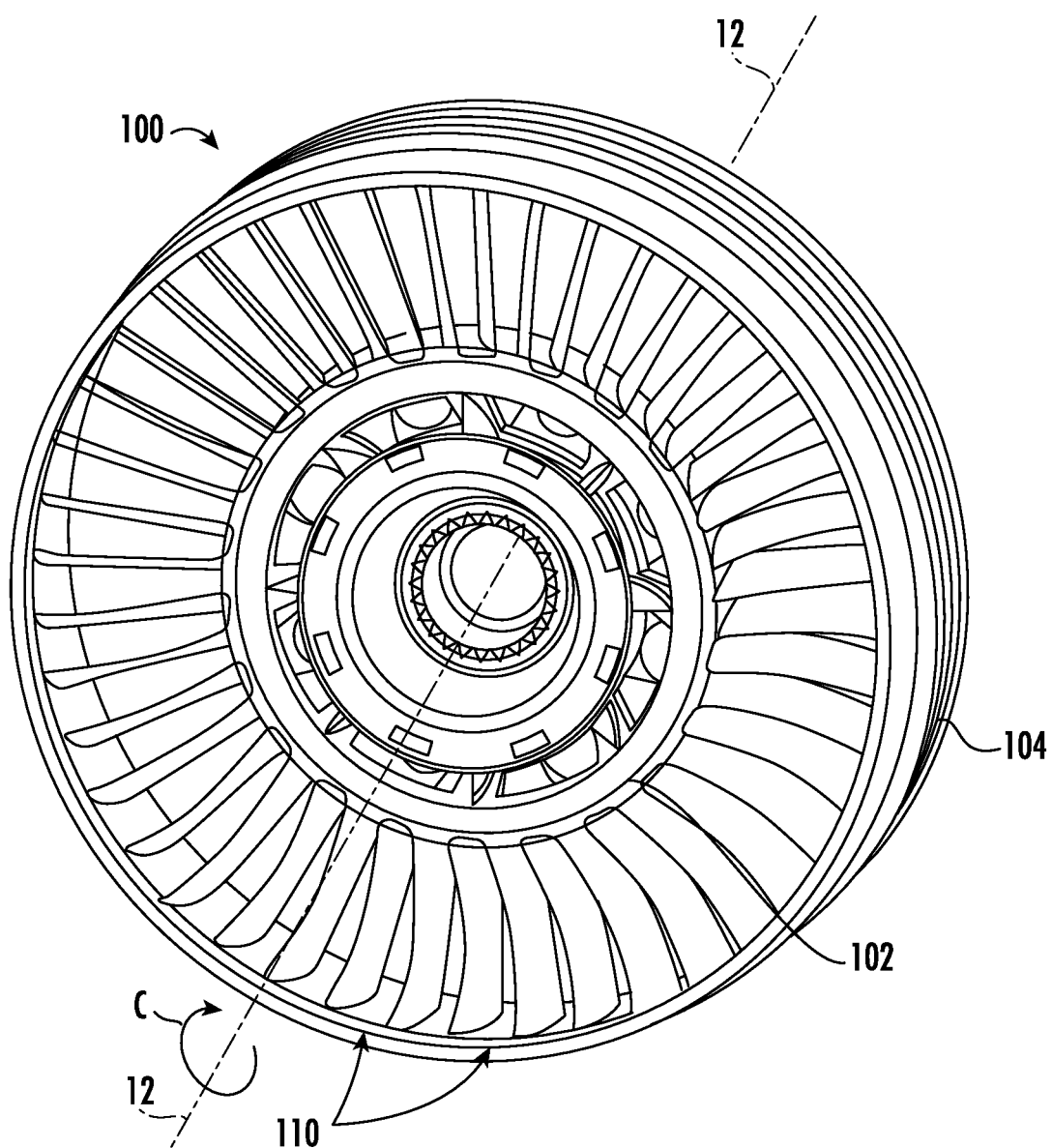
FIG. 2 is a perspective view of a fan frame that may be used with the exemplary gas turbine engine of FIG. 1.

Referring now to FIG. 2, a perspective view of a fan frame assembly 100 is shown. Fan frame assembly 100 is generally provided with a first circular frame member or fan hub frame 102, a second circular frame member or fan case 104, and a plurality double outlet ("doublet") guide vanes 110 disposed in a circumferential array about the hub frame 102 and fan case 104. According to an exemplary embodiment, the fan frame assembly 100 shares a longitudinal axis with longitudinal axis 12 of turbofan engine 10 (FIG. 1). In such a manner, it will be appreciated that the fan frame assembly 100 may be used for mounting outlet guide vanes 52 into turbofan engine 10. In this regard, the doublet guide vanes 110 provide the load path from the fan hub frame (and thereby turbomachine 16) and nacelle 50. Although the illustrated embodiment depicts the use of a double outlet guide vane 110, it should be appreciated that aspects of the present subject matter may be applied to singular outlet guide vanes as well.

Figure 3:
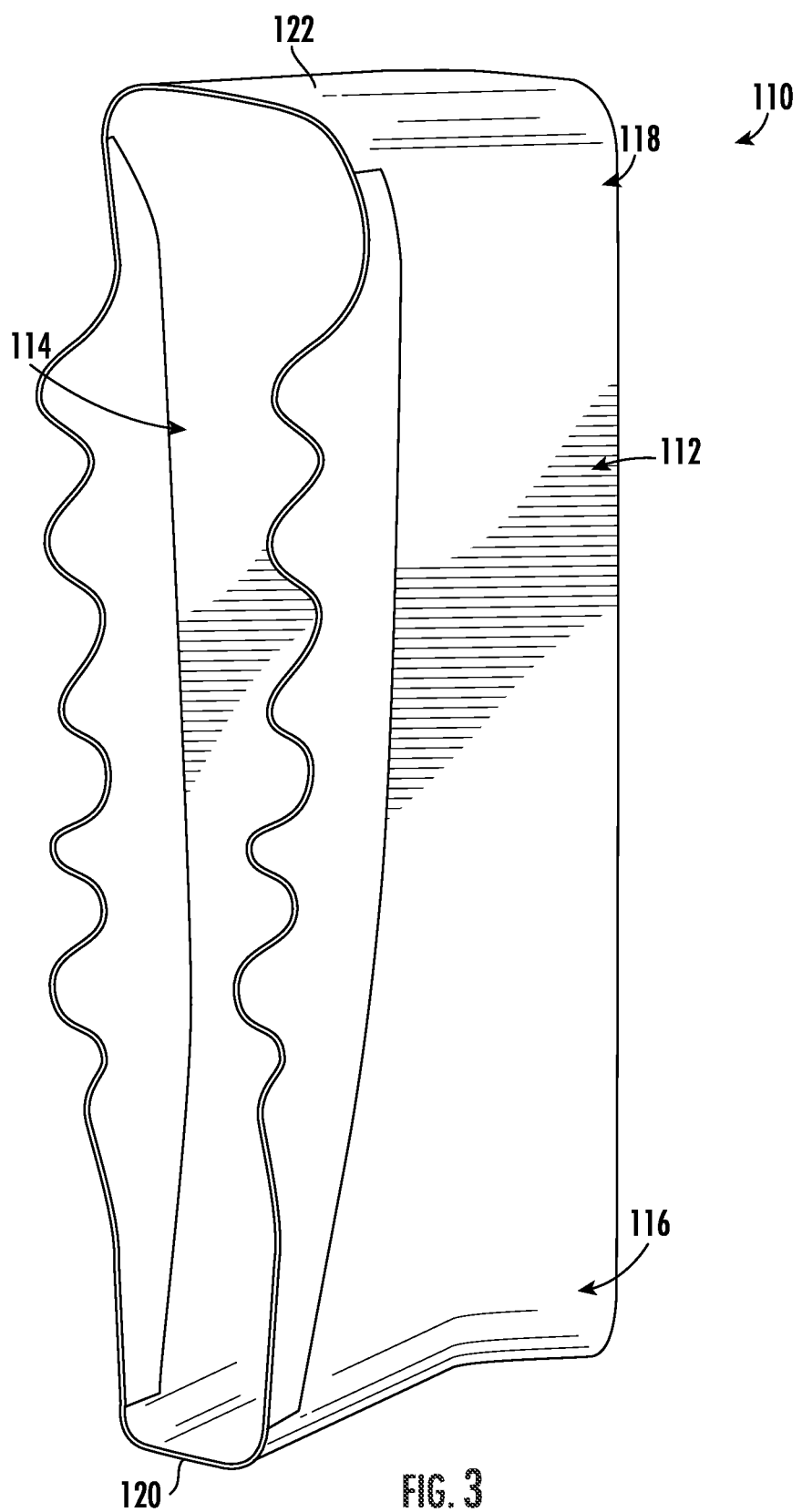
FIG. 3 is a perspective view of a double outlet guide vane in accordance with an exemplary embodiment of the present subject matter.

Referring now to FIG. 3, a perspective view is provided of an airfoil assembly in accordance with an exemplary aspect of the present disclosure having a first airfoil and a second airfoil. In particular, the airfoil assembly of FIG. 3 is configured as a double outlet guide vane 110. The double outlet guide vane 110 may be incorporated into the fan frame assembly 100 of FIG. 2, or alternatively may be incorporated into any other suitable design.

In such a manner, it will be appreciated that the first airfoil is configured as a first guide vane 112 and the second airfoil is configured as a second guide vane 114. Each of the first guide vane 112 and the second guide vane 114 generally define a root end 116 and a tip end 118. The double outlet guide vane 110 further includes a first end structure 120 that spans between the first guide vane 112 and the second guide vane 114 at the root end 116 of double outlet guide vane 110, and similarly includes a second end structure 122 that spans between the first guide vane 112 and the second guide vane 114 at the tip end 118. The first end structure 120 and second end structure 122 may be utilized to spread loads experienced by the double outlet guide vanes 110 to the surrounding hardware to which they are attached, such as the fan hub frame 102 and the fan case 104 (see, e.g., FIG. 2).

For the embodiment depicted, the first guide vane 112, the second guide vane 114, the first end structure 220, and the second end structure 222 are integrally formed together to form double outlet guide vane 110.

It should be appreciated, however, that according to alternative exemplary embodiments, first guide vane 112, second guide vane 114, first end structure 120, and second end structure 122 may be separate components that are attached together in any suitable manner to form double outlet guide vane 110. Alternatively, still, aspects of the present disclosure may apply to single outlet guide vane assemblies or any other suitable outlet guide vane assembly.

Figure 4:
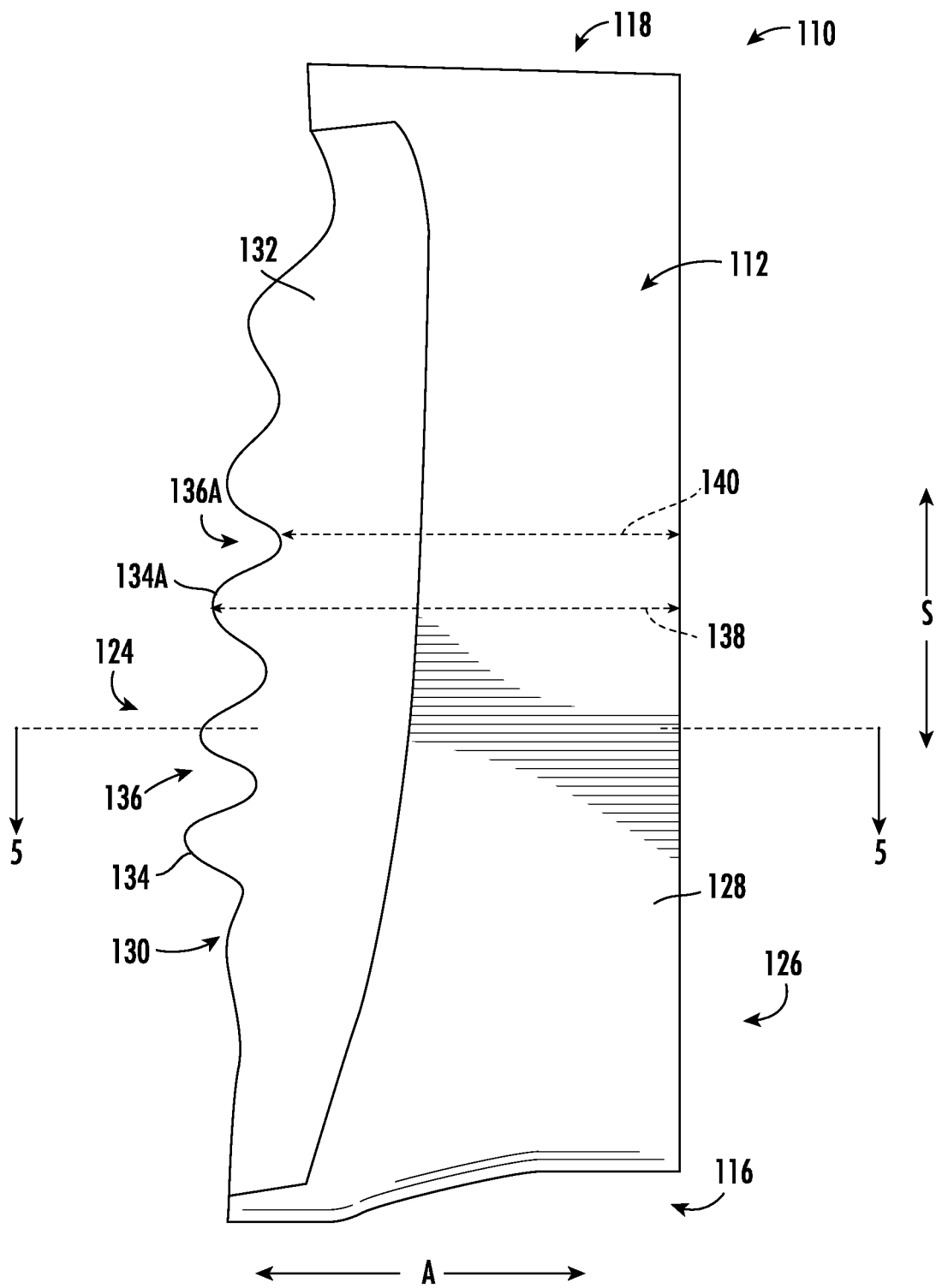
FIG. 4 is a side view of a first guide vane of the double outlet guide vane of FIG. 3.

Referring now also to FIG. 4, a side view of an airfoil in accordance with an exemplary aspect of the present disclosure is provided. More specifically, FIG. 4 provides a side view of the first guide vane 112 of FIG. 3. As will be appreciated, the first guide vane 112 defines a spanwise direction S, which may generally align with a radial direction of a gas turbine engine incorporating the first guide vane 112, and a chordwise direction C, as well as a leading edge end 124, and a trailing edge end 126. For the exemplary aspect depicted, the first guide vane 112 generally includes a body 128 extending along the spanwise direction S between the root end 116 and the tip end 118 of the first guide vane 112. The body 128 may generally be formed of a composite material.

The term "composite material" as used herein may be defined as a material containing a reinforcement such as fibers or particles supported in a binder or matrix material. Composite materials include metallic and non-metallic composites. One useful embodiment for composite airfoils is made of a unidirectional tape material and an epoxy resin matrix. The composite airfoils disclosed herein may include composite materials of the non-metallic type made of a material containing a fiber such as a carbonaceous, silica, metal, metal oxide, or ceramic fiber embedded in a resin material such as Epoxy, PMR15, BMI, PEED, etc. A more particular material includes fibers unidirectionally aligned into a tape that is impregnated with a resin, formed into a part shape, and cured via an autoclaving process or press molding to form a light-weight, stiff, relatively homogeneous article having laminates within. However, any suitable composite material and/or formation process may be used.

Referring still to FIG. 4, the first guide vane 112 further includes an edge member formed at least in part of a metal material, as will be described in more detail below. More specifically, for the embodiment shown, the edge member is a leading edge member 132 attached to the body 128 at the leading edge end 124 of the first guide vane 112. The leading edge member 132 defines a leading edge 130 of the first guide vane 112 at the leading edge end 124 of the first guide vane 112.

More specifically, still, for the exemplary embodiment of FIG. 4, the leading edge member 132 is a sculpted leading edge member, and the leading edge 130 defined by the leading edge member 132 is a nonlinear patterned leading edge 130. For example, for the embodiment shown, the nonlinear patterned leading edge 130 of the first guide vane 112 is a waved leading edge 130 defining a plurality of peaks 134 in a plurality of valleys 136 alternatingly arranged along the spanwise direction S.

A size, density, and number of the plurality of peaks 134 and the plurality of valleys 136 at the leading edge 130 of the first guide vane 112 may be chosen to, e.g., minimize noise attenuation during operation of the gas turbine engine. For example, in certain embodiments, the plurality of peaks 134 may include at least three peaks 134, such as at least four peaks 134, such as at least five peaks 134, such as up to twenty-five (25) peaks 134, such as up to twenty (20) peaks 134, such as up to fifteen (15) peaks 134, such as up to ten (10) peaks 134. There may be a similar number of valleys 136, with each valley 136 positioned between adjacent peaks 134.

Further, for the embodiment shown, it will be appreciated that the plurality of peaks 134 includes a first peak 134A and the plurality of valleys 136 includes a first valley 136A adjacent to the first peak 134A. The first guide vane 112 defines a first chord 138 at the first peak 134A and a second chord 140 at the first valley 136A. The first chord 138 is equal to at least 105% of the second chord 140, such as at least 110%, such as at least 115%, such as at least 120%, such as up 175% of the second chord 140.

In such a manner, it will be appreciated that the leading edge member 132 may be capable of reducing noise attenuation from, e.g., a fan section of an engine incorporating the exemplary guide vanes.

Figure 5:
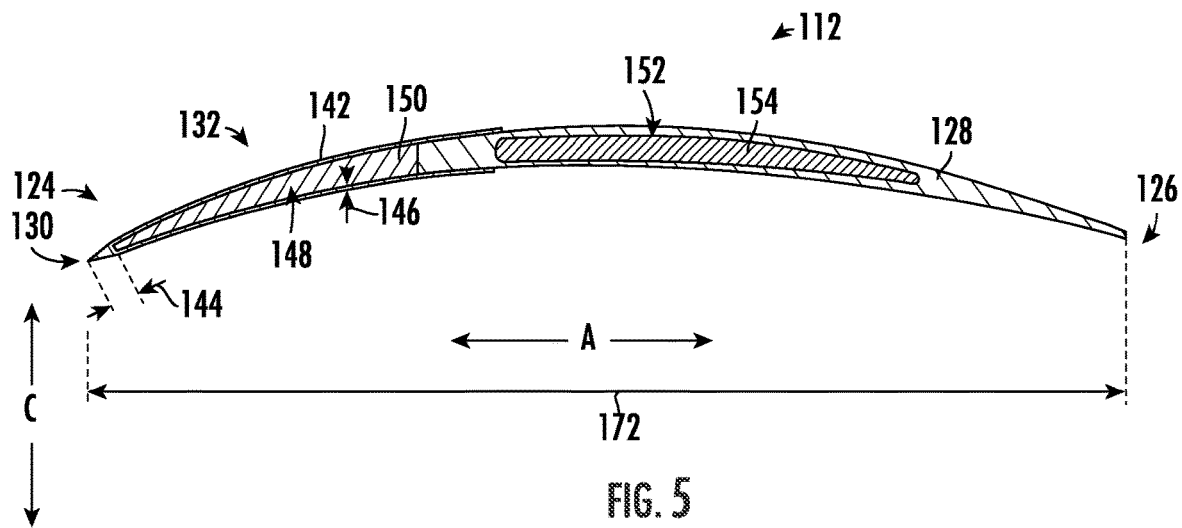
FIG. 5 is a cross-sectional view of the first guide vane of FIG. 4, along Line 5-5 in FIG. 4.
Figure 6:
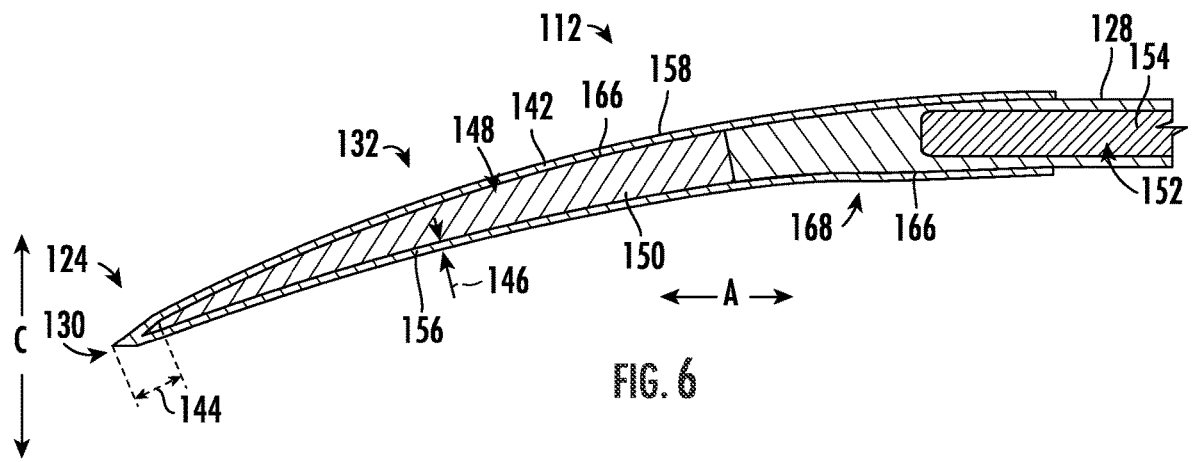
FIG. 6 is a close-up view of a leading edge member of the first guide vane of FIG. 5.

Referring now to FIGS. 5 and 6, cross-sectional views are provided of an airfoil in accordance with the present disclosure along a spanwise direction S of the airfoil. More specifically, for the exemplary embodiment of FIGS. 5 and 6, the airfoil is the first guide vane 112 of FIG. 4, and the view is along Line 5-5 in FIG. 4. In such a manner, it will be appreciated that FIG. 5 provides a cross-sectional view of the first guide vane 112 along Line 5-5 in FIG. 4, and FIG. 6 provides a close-up, cross-sectional view of the leading edge member 132 of the first guide vane 112.

As will be appreciated, the edge member includes a shell 142 formed of a metal material. The shell 142 may be referred to as an edge shell. More specifically, since the edge member is a leading edge member, the shell 142 may be referred to as a leading edge shell. More specifically, still, since the edge member is a sculpted leading edge member, the shell 142 may be referred to as a sculpted leading edge shell. Forming the shell 142 of the metal material may better allow for the first guide vane 112 to accommodate foreign object collisions such as, e.g., bird strikes and ice ingestion during operation of the gas turbine engine while minimizing damage, despite the body 128 being formed of a composite material.

To assist with such a configuration, it will be appreciated that the shell 142 of the leading edge member 132 defines a leading edge thickness 144 and a side thickness 146. The leading edge thickness 144 may be greater than the side thickness 146. For example, the leading edge thickness 144 may be at least two times the side thickness 146, such as at least three times a side thickness 146, such as up to twenty (20) times the side thickness 146. Such may create a robust leading edge 130 that may accommodate foreign object collisions during operation. By way of example only, in certain exemplary embodiments, the side thickness 146 may be between about 0.001 inches and 0.2 inches, and the leading edge thickness 144 may be between about 0.15 inches and one (1) inch.

Further, for the embodiment shown, the shell 142 of the leading edge member 132 defines at least in part an internal cavity 148. For the embodiment shown, the leading edge member 132 further includes a filler 150 positioned within the internal cavity 148. The filler 150 may be a structural filler configured to assist with maintaining a structural integrity of the leading edge member 132 the event the first guide vane 112 experiences a foreign object collision during operation.

By way of example, in certain embodiments, the filler 150 may be a foam material, a honeycomb income material, or both. More specifically, for the embodiment shown, the filler 150 is a foam material. The foam may be a relatively low dense foam, having a relatively high strength and shear stiffness. For example, the foam may have a density between about fifteen (15) pounds per cubic feet and about one (1) pound per cubic feet. For example, the foam may have a density between about thirteen (13) pounds per cubic feet and about four (4) pounds per cubic feet, such as between about twelve (12) pounds per cubic feet and about six (6) pounds per cubic feet. Further, in certain exemplary embodiments the foam chosen as the filler 150 may be a relatively stiff foam, defining a shear stiffness (or modulus of rigidity) greater than about 15 pounds per square inch (psi), such as greater than about 18 psi, such as greater than 23 psi, such as greater than or equal to about 28 psi and less than about 100 psi.

Notably, however, in other exemplary embodiments, the filler 150 may be formed of a material having a greater density, such as a density of 80 pounds per cubic feet or less, such as a density of 70 pounds per cubic feet or less. The filler material 150 may be a solid resin in such a configuration.

Further, still, the foam may define a relatively low Young's modulus (also known as tensile modulus). Specifically, the foam may each be formed of material defining a Young's modulus less than about one twenty-five (125) thousand pounds per square inch (ksi). For example, the foam may be formed of material defining a Young's modulus less than about one hundred (100) ksi, less than about seventy-five (75) ksi, or less than about sixty (60) ksi. Moreover, the foam may be formed of a material having an elongation at break greater than about two and a half (2.5) percent. For example, the foam may be formed of a material having an elongation at break greater than about three (3) percent, such as greater than about four (4) percent, such as greater than about eight (8) percent, such as greater than about ten (10) percent. As used herein, the term "elongation at break" refers to a ratio between a changed length and initial length after breakage of a material. The term elongation at break is a measure of a capability of a material to resist changes in shape without crack formation.

Referring particularly to FIG. 6, it will be appreciated that in the embodiment shown, the filler 150 substantially completely occupies the internal cavity 148 defined by the shell 142 of the leading edge member 132. More specifically, for the embodiment shown the filler 150 occupies at least about 90% of the internal cavity 148 defined by the shell 142 of the leading edge member 132, such as at least about 95%, such as at least about 98%, such as at least about 99% of the internal cavity 148.

Figure 7:
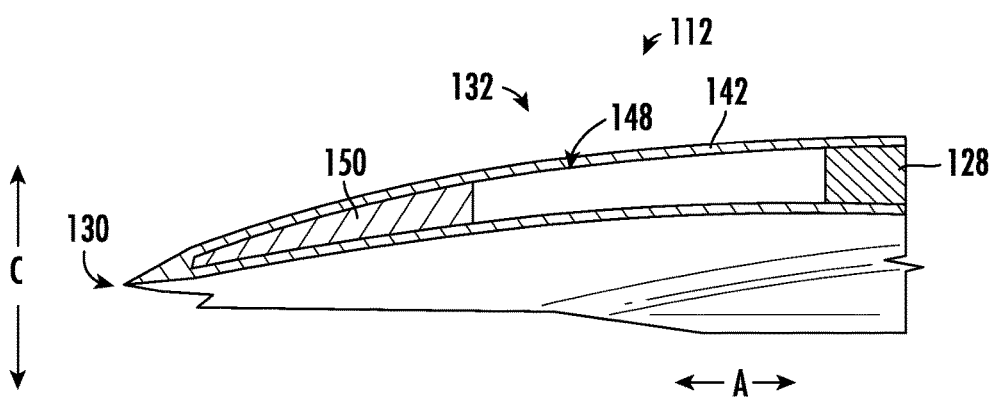
FIG. 7 is a close-up view of a leading edge member according to an alternative exemplary embodiments of the present subject matter.

It will be appreciated, however, that in other exemplary embodiments, the leading edge member 132 of the first guide vane 112 may not include a filler 150 to substantially completely occupy the internal cavity 148 defined by the shell 142 of the leading edge member 132. For example, referring up briefly to FIG. 7, a close-up, schematic view of a leading edge member 132 of an airfoil in accordance with another exemplary embodiment of the present disclosure is provided. The leading edge member 132 of FIG. 7 may be configured in substantially the same manner as the exemplary leading edge member 132 of the guide vane of FIG. 6. For example, the leading edge member 132 of FIG. 7 may generally include a shell 142 defining at least in part an internal cavity 148. However, for the embodiment shown, the leading edge member 132 does not include a filler 150 substantially completely occupying the internal cavity 148, and instead the filler 150 of the leading edge member 132 occupies between about 20% of the internal cavity 148 and about 90% of the internal cavity 148, such as at least 50% of the internal cavity 148. For example, as depicted in the embodiment of FIG. 7, in certain exemplary embodiments, the filler 150 may only occupy a forward portion of the leading edge member 132, such as a forward 20% portion of the internal cavity 148, such as a forward 30% portion of the internal cavity 148, such as a forward 40% portion of the internal cavity 148, such as a forward 50% portion of the internal cavity 148 (each by total volume). In such a manner, the filler 150 may provide structural support for the leading edge member 132 at locations most susceptible to damage from foreign object collisions during operations. For example, the filler 150 may occupy portions of the internal cavity 148 within the peaks 134 of the leading edge member 132.

Referring now back to FIGS. 5 and 6, it will further be appreciated that the body 128 defines a body internal cavity 152. The body internal cavity 152 may run along at least 50% of body 128 and the chordwise direction C (see FIG. 5). The body internal cavity 152 may include a body filler 154 substantially completely occupying the body internal cavity 152. The body filler 154 may be the same material as the filler 150 for the leading edge member 132, or alternatively, may be any other suitable filler, such as any other suitable filler meeting the specifications described above with reference to the filler 150 for the leading edge member 132.

Moreover, referring still to FIG. 6, it will be appreciated that the leading edge member 132 may be bonded to the body 128 of the guide vane in any suitable manner. For example, in certain exemplary embodiments, the leading edge member 132 may be bonded to the body 128 of the guide vane using one or more of adhesives, mechanical fasteners, complementary geometry, etc.

Figure 8:
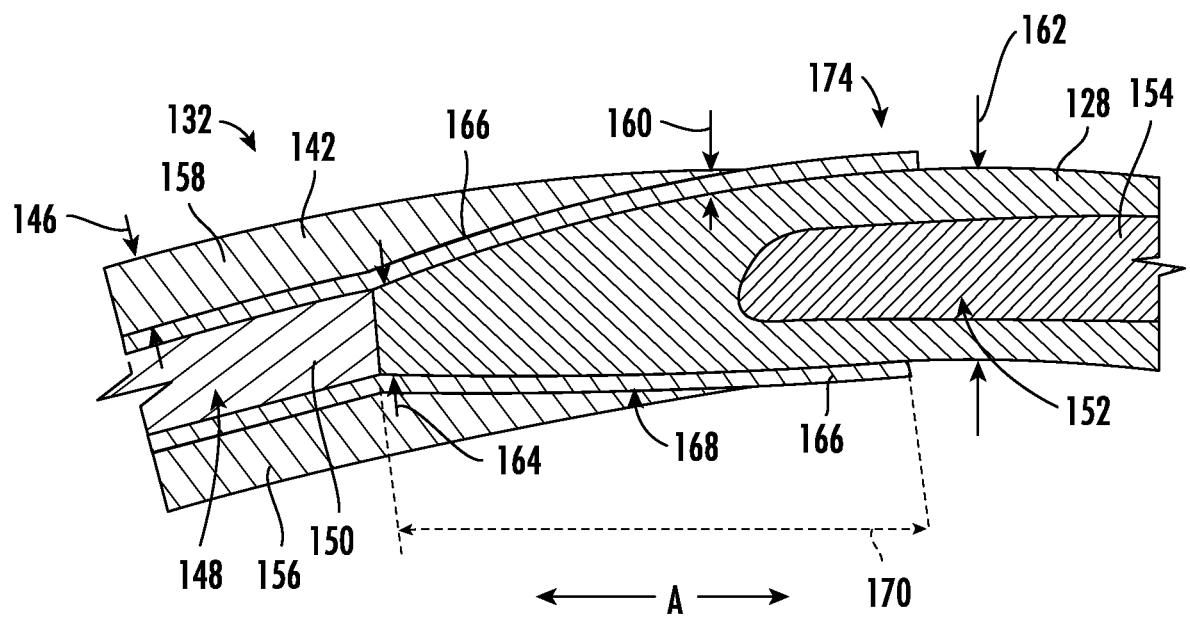
FIG. 8 is another close-up view of the leading edge member of the first guide vane of FIG. 5, at a juncture between the leading edge member and a body of the first guide vane.

More specifically, referring now also to FIG. 8, providing a close-up view of a juncture between the body 128 and the leading edge member 132, it will be appreciated that the leading edge member 132 is bonded to the body 128. For the embodiment shown, the shell 142 includes a pressure side portion 156 and a suction side portion 158. The pressure side portion 156 and suction side portion 158 of the shell 142 each includes an overlapping section configured to overlap with the body 128 of the guide vane. The overlapping section of the pressure side portion 156 of the shell 142 and the overlapping section of the suction side portion 158 of the shell 142 each tapers down, such that an end thickness 160 at an end of each of the overlapping sections is much less than a side thickness 146 of the shell 142 defining the internal cavity 148. For example, the side thickness 146 may be at least two times the end thickness 160, such as at least three times the end thickness 160, such as up to 200 times the end thickness 160.

Similarly, for the embodiment shown, the body 128 is configured to taper down at an end adjacent to the leading edge member 132, where the overlapping portions of the pressure and suction side portions 156, 158 of the shell 142 overlap with the body 128. For example, the body 128 defines a first thickness 162 at a location spaced from the leading edge member 132 and a second thickness 164 at the end adjacent the leading edge member 132. The second thickness 164 is less than the first thickness 162. For example, the second thickness 164 may be equal to about 95% or less of the first thickness 162, such as 90% or less, 85% or less, or 75% or less of the first thickness 162 and at least 10% of the first thickness, such as at least 25%, such as at least 50% of the first thickness 162.

Further, for the embodiment shown, the leading edge member 132 further includes an intermediate layer 166. The leading edge member 132 is bonded to the body 128 at least in part through the intermediate layer 166. More specifically, it will be appreciated that for the embodiment shown, the intermediate layer 166 may be configured as a fiber ply applied over at least a portion of the filler 150 and over at least a portion of the body 128. With such a configuration, the shell 142 of the leading edge member 132 may be bonded to the fiber ply, and the fiber ply may, in turn, be bonded to the body 128 using, e.g., a resin or any other suitable bonding method for bonding composite materials.

In the exemplary embodiment shown, the intermediate layer 166 is applied over an overlap portion 168 of the body 128 of the first guide vane 112. The overlap portion 168 of the body 128 the airfoil defines a length 170 in the chordwise direction C. Further, it will be appreciated that the first guide vane 112 defines a chord 172 at the spanwise location of the overlap portion 168 (see FIG. 5). The length of the overlap portion 168 is equal to at least 5% of the chord 172 of the first guide vane 112 at the spanwise location of the overlap portion 168. For example, the length of the overlap portion 168 may be equal to at least 10% of the chord 172, such as up to about 30% of the chord 172.

In certain embodiments, the intermediate layer 166 may be a prepreg ply (i.e., a layer of composite fiber materials "pre-impregnated" with a polymer matrix material, such as epoxy or phenolic resin, or even thermoplastic materials), such as a carbon fiber prepreg ply.

Further, with respect to bonding the shell 142 to the intermediate layer 166. For example, the shell 142 of the leading edge member 132 may be formed through an electroforming process. As used herein, the term "electroforming" generally refers to a metal formation process in which a part is fabricated through electrodeposition of a metal onto a conductive material.

In such a manner, it will be appreciated that the filler 150 may be a nonelectrically conductive filler. Accordingly, in order to utilize the electroforming process, an electrically conductive coating may need to be applied to the filler 150. Specifically, for the embodiment depicted, the filler 150 is a nonelectrically conductive filler and the intermediate layer 166 is an electrically conductive intermediate layer. For example, the intermediate layer 166 may be an electrically conductive ply, such as carbon fiber prepreg ply as discussed above. The shell 142 of the leading edge member 132 may then be formed onto the electrical conductive coating through the electroforming process. In such a manner, the shell 142 may be formed onto and bonded to the intermediate layer 166.

As noted above, the intermediate layer 166, acting as the electrically conductive coating, may further be applied at least partially over the body 128 of the first guide vane 112, such that the shell 142 may further be formed over the body 128 of the first guide vane 112, to bond the leading edge member 132 to the body 128 of the first guide vane 112. More specifically, it will be appreciated that for the exemplary embodiment of FIG. 7, the intermediate layer 166 includes a portion 174 that extends over the body 128 and past an end of the shell 142. The portion 174 extending over the body 128 and past the end of the shell 142 may be more fully bonded to the body 128, as it may not be necessary for the electrically conductive properties of the portion 174 to be exposed to facilitate formation of the shell 142 through an electroforming process.

Forming the leading edge member 132 in accordance with such an exemplary aspect may allow for inclusion of a metal leading edge member 132 on an otherwise composite airfoil, without requiring mechanical fasteners or other structurally impeding or intrusive mechanisms to facilitate the attachment.

It will be appreciated, however, that the exemplary embodiments described above are provided by way of example only. In other exemplary embodiments, any other suitable configuration may be provided. For example, although the exemplary embodiment of FIGS. 3 through 8 are discussed with reference to a guide vane such as the first guide vane 112, in other exemplary embodiments, the guide vane may instead be any other suitable airfoil of an engine. For example, in other embodiments, aspects of the present disclosure may be applied to a rotating airfoil, such as a fan blade or rotor blade, any other suitable stationary airfoil or guide vane, etc.

Further, it will be appreciated that although the leading edge member 132 is described above as being a leading edge member 132, and other exemplary aspects of the present disclosure, the concepts described herein may be applied to any other suitable edge member of an airfoil for, e.g., attaching such edge member to a body 128 of the airfoil. For example, in other exemplary embodiments, the concepts described herein may be applied to a non-leading edge member, such as a trailing edge member, to bond such edge member to a body 128 of an airfoil.

Further still, although aspects of the present disclosure describe structure formed in a particular manner, in other exemplary embodiments, the structure may be formed in any other suitable manner, such as through any other suitable formation process, attachment process, etc.

Moreover, it will be appreciated that in other exemplary embodiments, the leading edge member 132 may be bonded to the body 128 of the guide vane in any suitable manner. For example, in certain exemplary embodiments, the leading edge member 132 may include or be formed of a metal, such as metal shell 142, that is directly bonded to the body 128 of the airfoil.

Figure 9:
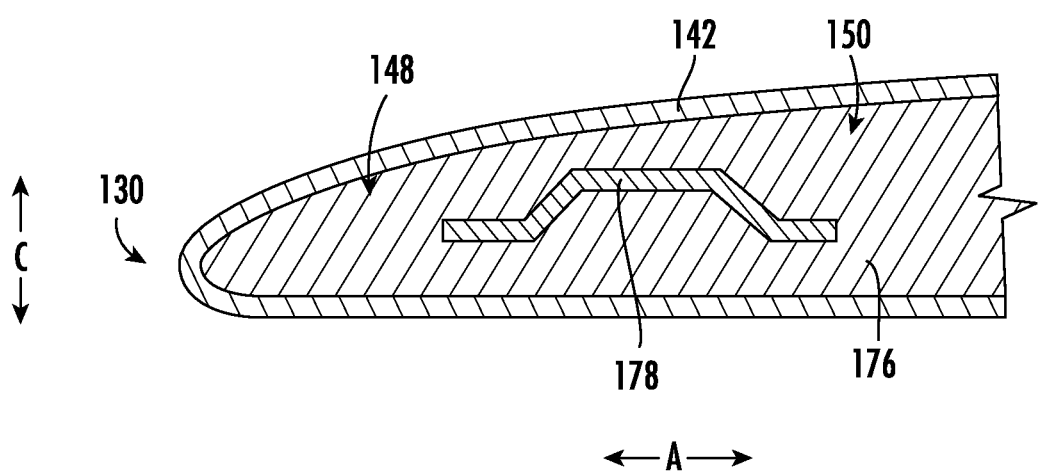
FIG. 9 is a close-up view of a leading edge member according to another alternative exemplary embodiments of the present subject matter.

Further, still, it will be appreciated that although the filler material 150 positioned within the internal cavity 148 is in at least certain embodiments configured as a solid foam material, in other embodiment other suitable configurations may be provided. For example, referring now briefly to FIG. 9, it will be appreciated that in other exemplary embodiments, the filler material 150 may include a first material 176 and a second material 178, wherein the second material 178 is completely enclosed within the first material 176 and acts as a stiffening member for the filler material 150. For example, the first material 176 may be a foam, and the second material 178 may be a metal or other relatively stiff material positioned within the foam to increase a stiffness/strength of the foam. For the embodiment shown, the second material 178 arranged as a truss extending through the first material 176 along a lengthwise direction (e.g., along a radial direction when incorporated into an engine). Other configurations are contemplated as well.

Figure 10:
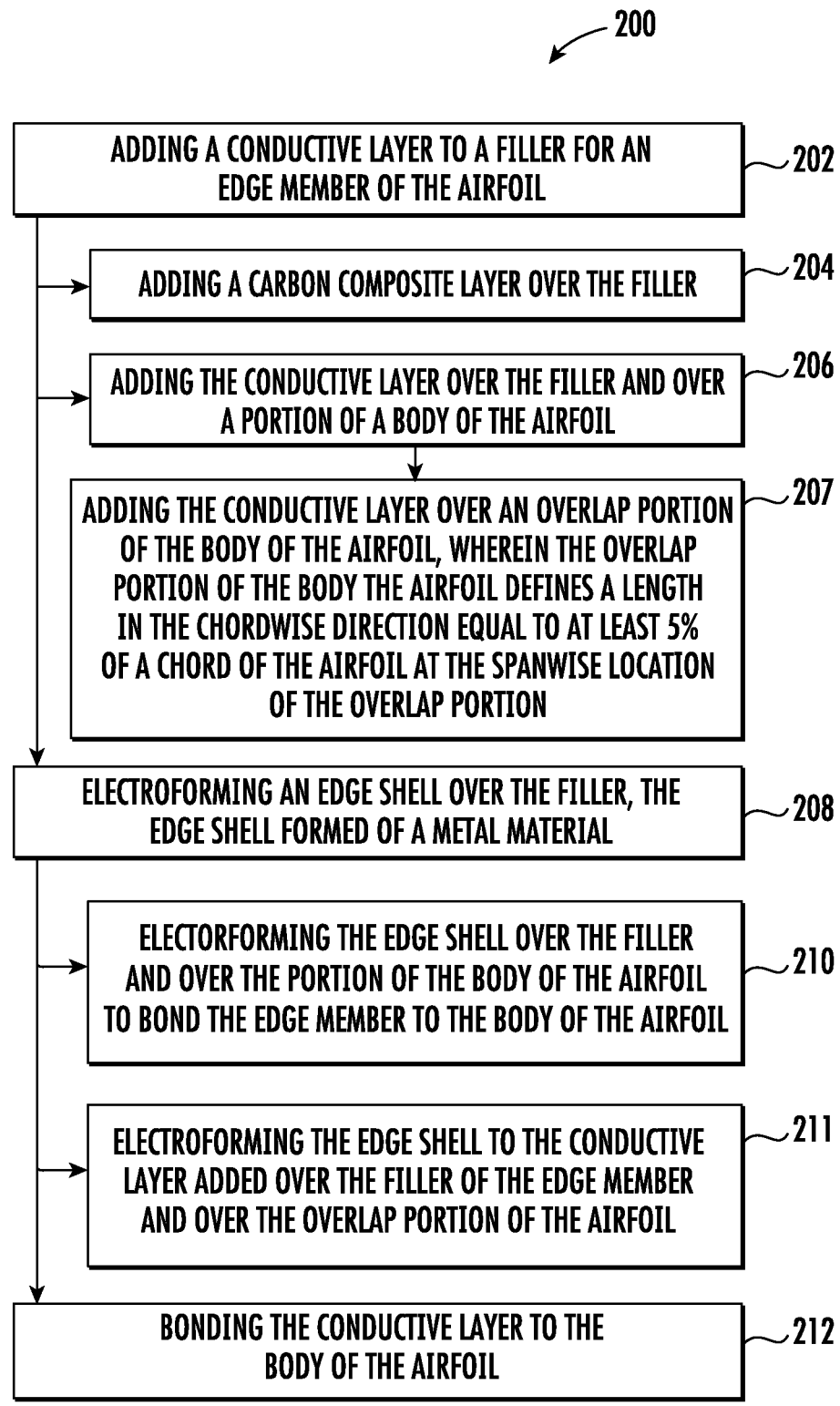
FIG. 10 is a flow diagram of a method of forming an airfoil in accordance with an exemplary aspect of the present disclosure.

Referring now to FIG. 10, a flow diagram is provided of a method 200 of forming an airfoil in accordance with an exemplary aspect of the present disclosure. In certain exemplary aspects, the method 200 of FIG. 8 may be utilized with one or more the exemplary airfoils and/or guide vanes described above with rooms to FIG. 1 through seven. However, other exemplary aspects, the method 200 of FIG. 10 may be utilized with any other suitable airfoil and/or guide vane.

For the exemplary aspect depicted, the method 200 includes at (202) adding a conductive layer to a filler for an edge member of the airfoil. In certain exemplary aspects, adding the conductive layer to the filler at (202) includes at (204) adding a carbon composite layer over the filler, such as a carbon fiber prepreg ply over the filler. Further, in certain exemplary aspects, adding the conductive layer to the filler at (202) includes at (206) adding the conductive layer over the filler and over a portion of a body of the airfoil. For example, adding the conductive layer over the filler and over the portion of the body of the airfoil at (206) includes at (207) adding the conductive layer over an overlap portion of the body of the airfoil, wherein the overlap portion of the body the airfoil defines a length in the chordwise direction equal to at least 5% of a chord of the airfoil at the spanwise location of the overlap portion. For example, the length of the overlap portion may be equal to at least 10% of the chord of the airfoil at the radial location, such as up to about 30% of the chord of the airfoil at the radial location.

Referring still to FIG. 10, the method 200 further includes at (208) electroforming an edge shell over the filler, the edge shell formed of a metal material. More specifically, for the exemplary aspect shown, electroforming the edge shell over the filler at (208) includes at (210) electroforming the edge shell over the filler and over the portion of the body of the airfoil to bond the edge member to the body of the airfoil. More specifically, for the exemplary aspect shown, electroforming the edge shell over the filler at (208) includes at (211) electroforming the edge shell to the conductive layer added over the filler of the edge member and over the overlap portion of the body of the airfoil.

Further, still, for the exemplary aspect of the method 200 depicted, the method 200 further includes at (212) bonding the conductive layer to the body of the airfoil. Bonding the conductive layer to the body of the airfoil at (212) may occur prior to electroforming the edge shell over the filler at (208), after electroforming the edge shell over the filler at (208), or both. Further, bonding the conductive layer to the body of the airfoil at (212) may include bonding the conductive layer to the body of the airfoil using, e.g., an epoxy or other adhesive material. Further, still, bonding the conductive layer to the body of the airfoil at (212) may include bonding a portion of the conductive layer that extends over the body of the airfoil pas the edge shell to the body of the airfoil.

The edge member may be a leading edge member, such as a sculpted leading edge member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil for a gas turbine engine defining a spanwise direction, a root end, a tip end, a leading edge end, and trailing edge end, the airfoil comprising: a body extending along the spanwise direction between the root end and the tip end, the body formed of a composite material; and a sculpted leading edge member attached to the body positioned at the leading edge end of the airfoil, the sculped leading edge member formed at least in part of a metal material and defining a non-linear patterned leading edge of the airfoil.

The airfoil of one or more of these clauses, wherein the sculpted leading edge member comprises a leading edge shell formed of the metal material, wherein the leading edge shell defines at least in part a leading edge internal cavity, and wherein the sculpted leading edge member further comprises a filler positioned within the leading edge internal cavity.

The airfoil of one or more of these clauses, wherein the filler is a foam material, a honeycomb material, or both.

The airfoil of one or more of these clauses, wherein the filler defines a density less than 80 pounds per cubic foot.

The airfoil of one or more of these clauses, wherein the filler is a non-electrically conductive material.

The airfoil of one or more of these clauses, wherein the sculpted leading edge member further comprises an electrically conductive layer between the filler and the leading edge shell.

The airfoil of one or more of these clauses, wherein the filler occupies at least 95% of the leading edge internal cavity.

The airfoil of one or more of these clauses, wherein the sculpted leading edge member further comprises an intermediate layer between the filler and the leading edge shell, wherein the intermediate layer extends at least partially over the body, wherein the intermediate layer is bonded to the body, and wherein the leading edge shell is bonded to the intermediate layer.

The airfoil of one or more of these clauses, wherein the sculpted leading edge member forms at least 20% of the airfoil in a chordwise direction at a spanwise location of the airfoil.

The airfoil of one or more of these clauses, wherein the non-linear patterned leading edge of the airfoil is a waved leading edge of the airfoil.

The airfoil of one or more of these clauses, wherein the non-linear patterned leading edge of the airfoil defines a plurality of peaks including a first peak and a plurality of valleys including a first valley, and wherein the airfoil defines a first chord at the first peak and a second chord at the second peak, wherein the first chord is at least 110% of the second chord.

The airfoil of one or more of these clauses, wherein the airfoil is an outlet guide vane for the gas turbine engine.

A method of forming an airfoil comprising: adding a conductive layer to a filler for an edge member of the airfoil; and electroforming an edge shell over the filler, the edge shell formed of a metal material.

The method of one or more of these clauses, wherein adding the conductive layer to the filler comprises adding the conductive layer over the filler and over a portion of a body of the airfoil, wherein the body is formed of a composite material.

The method of one or more of these clauses, wherein electroforming the edge shell over the filler comprises electroforming the edge shell over the filler and over the portion of the body of the airfoil to bond the edge member to the body of the airfoil.

The method of one or more of these clauses, wherein adding the conductive layer to the filler comprises adding a carbon composite layer over the filler.

The method of one or more of these clauses, wherein the filler is a non-electrically conductive material.

The method of one or more of these clauses, wherein the edge member is a leading edge member defining a non-linear patterned leading edge for the airfoil.

An airfoil for a gas turbine engine defining a spanwise direction, a root end, and a tip end, the airfoil comprising: a body extending along the spanwise direction between the root end and the tip end, the body formed of a composite material; and an edge member comprising an edge shell formed of the metal material and defining at least in part an internal cavity; filler positioned in the internal cavity; and an intermediate layer between the filler and the edge shell and extending at least partially over the body, wherein the intermediate layer is bonded to the body and the edge shell is bonded to the intermediate layer.

The airfoil of one or more of these clauses, wherein the filler is a non-electrically conductive material, wherein the intermediate layer is an electrically conductive layer, and wherein the edge shell is formed onto the intermediate layer through an electroforming process to bond the edge shell to the intermediate layer.

What is claimed is:

1. An airfoil for a gas turbine engine defining a spanwise direction, a root end, a tip end, a leading edge end, and trailing edge end, the airfoil comprising:
   a body extending along the spanwise direction between the root end and the tip end, the body formed of a composite material; and
   a sculpted leading edge member attached to the body positioned at the leading edge end of the airfoil, the sculpted leading edge member formed at least in part of a solid metal material and defining a non-linear patterned leading edge of the airfoil, the sculpted leading edge member comprising a leading edge shell formed of the solid metal material, defining a leading edge internal cavity, and further comprising a filler completely enclosed within the leading edge internal cavity wherein the filler comprises a first material and a second material, wherein the second material is completely enclosed within the first material, and wherein the first material is a foam, and the second material is a rigid metal.

2. The airfoil of claim 1, wherein the filler defines a density less than 80 pounds per cubic foot.

3. The airfoil of claim 1, wherein the filler is a non-electrically conductive material.

4. The airfoil of claim 3, wherein the sculpted leading edge member further comprises an electrically conductive layer between the filler and the leading edge shell.

5. The airfoil of claim 1, wherein the filler occupies at least 95% of the leading edge internal cavity.

6. The airfoil of claim 1, wherein the sculpted leading edge member further comprises an intermediate layer between the filler and the leading edge shell, wherein the intermediate layer extends at least partially over the body, wherein the intermediate layer is bonded to the body, and wherein the leading edge shell is bonded to the intermediate layer.

7. The airfoil of claim 1, wherein the sculpted leading edge member forms at least 20% of the airfoil in a chordwise direction at a spanwise location of the airfoil.

8. The airfoil of claim 1, wherein the non-linear patterned leading edge of the airfoil is a waved leading edge of the airfoil.

9. The airfoil of claim 1, wherein the non-linear patterned leading edge of the airfoil defines a plurality of peaks including a first peak, a second peak, and a plurality of valleys including a first valley, and wherein the airfoil defines a first chord at the first peak and a second chord at the second peak, wherein the first chord is at least 110% of the second chord.

10. The airfoil of claim 1, wherein the airfoil is an outlet guide vane for the gas turbine engine.

11. The airfoil of claim 1, wherein the second material is arranged as a truss extending through the first material along a lengthwise direction.

12. A method of forming an airfoil comprising:
adding a conductive layer to a filler for an edge member of the airfoil; and
electroforming an edge shell over the filler, the edge shell formed of a metal;
wherein adding the conductive layer to the filler comprises adding the conductive layer over the filler and over a portion of a body of the airfoil, wherein the body is formed of a composite material; and
wherein electroforming the edge shell over the filler comprises electroforming the edge shell over the filler and over the portion of the body of the airfoil to bond the edge member to the body of the airfoil.

13. The method of claim 12, wherein adding the conductive layer to the filler comprises adding a carbon composite layer over the filler.

14. The method of claim 12, wherein the filler is a non-electrically conductive material.

15. The method of claim 12, wherein the edge member is a leading edge member defining a non-linear patterned leading edge for the airfoil.

16. An airfoil for a gas turbine engine defining a spanwise direction, a root end, and a tip end, the airfoil comprising:
a body extending along the spanwise direction between the root end and the tip end, the body formed of a composite material; and
an edge member comprising
an edge shell formed of a solid metal material and defining at least in part an internal cavity;
filler enclosed in the internal cavity wherein the filler is a foam material, a honeycomb material, or both; and
an intermediate layer between the filler and the edge shell and extending at least partially over the body, wherein the intermediate layer is bonded to the body and the edge shell is bonded to the intermediate layer.

17. The airfoil of claim 16, wherein the filler is a non-electrically conductive material, wherein the intermediate layer is an electrically conductive layer, and wherein the edge shell is formed onto the intermediate layer through an electroforming process to bond the edge shell to the intermediate layer.

* * * * *